United States Patent [19]

Seiger

[11] 3,887,399

[45] June 3, 1975

[54] METHOD FOR PRODUCING ELECTRICAL ENERGY WITH CONSUMABLE ALUMINUM ANODE

[75] Inventor: Harvey N. Seiger, Granada Hills, Calif.

[73] Assignee: Textron Inc., Providence, R.I.

[22] Filed: May 10, 1971

[21] Appl. No.: 141,880

[52] U.S. Cl. ............................. 136/86 A; 136/155
[51] Int. Cl. ........................................... H01m 29/04
[58] Field of Search ....................... 136/86, 155, 20

[56] References Cited
UNITED STATES PATENTS

| | | | |
|---|---|---|---|
| 2,612,532 | 9/1952 | Heise et al. | 136/86 A |
| 2,991,325 | 7/1961 | Kordesch | 136/155 |
| 3,218,195 | 11/1965 | Corren | 136/86 A |
| 3,415,688 | 12/1968 | Foucry | 136/155 X |
| 3,623,911 | 11/1971 | Oswin | 136/86 A X |

FOREIGN PATENTS OR APPLICATIONS

| | | | |
|---|---|---|---|
| 293,299 | 10/1929 | United Kingdom | |
| 18,931 | 1905 | United Kingdom | 136/86 A |
| 4,320,726 | 9/1968 | Japan | 136/86 A |

*Primary Examiner*—A. B. Curtis
*Attorney, Agent, or Firm*—Nilsson, Robbins, Bissell, Dalgarn & Berliner

[57] ABSTRACT

A high energy density battery utilizing a consumable activated aluminum anode, a permeable, electrically conductive cathode through which an oxidant is diffused, and an aqueous electrolyte solution. The anode is activated by alloying its surface with a metal more electronegative than aluminum, by coating the surface therewith or by dissolving ions of the metal in the electrolyte. The preferred anode activator is mercury. Other activators include gallium, cadmium, indium and thallium.

9 Claims, 2 Drawing Figures

METHOD FOR PRODUCING ELECTRICAL ENERGY WITH CONSUMABLE ALUMINUM ANODE

FIELD OF THE INVENTION

The fields of art to which the invention pertains include the fields of electrochemical converters, fuel cells, gastype primary batteries and batteries incorporating halogen electrolyte solutions.

BACKGROUND AND SUMMARY OF THE INVENTION

It is well established that pollution of the atmosphere occurs in large part as a result of the operation of automotive internal combustion engines. It has been suggested to replace such engines with electric motors powered by on-board batteries. However, the low energy densities of present day batteries makes such electric automobiles impractical as a replacement for the internal combustion engine automobile. In efforts to overcome these deficiencies, a number of exotic electrochemical cells have been developed having energy densities an order of magnitude greater than the common lead-acid battery. Among these are the hydrogen-oxygen fuel cell, which is too expensive for practical use, silver-zinc batteries, which have limited life and are very costly, and sodium-sulfur batteries, which are costly, operate hot and must be sealed from the atmosphere. Nickel-cadmium and lead-acid batteries of improved design have also been developed. Some of these batteries, such as the lead-acid battery have a very low recharge efficiency at high rates of charge and are only useful in hybrid systems in which the batteries are recharged during operation. Other systems which have been discussed in the prior art are aluminum-chlorine systems utilizing molten or fused electrolyte, for example a molten eutectic salt of aluminum chloride-potassium chloride-sodium chloride. A number of aqueous systems have been suggested utilizing halogen gas in a diffusion cathode in aqueous electrolyte solution and a zinc or alkaline earth metal anode. Some older patents refer to accumulator electrodes utilizing an electrolyte cation identical to the active anode component. Patents of interest herein are LeDuc U.S. Pat. Nos. 3,294,586 and 3,421,994, Zito, Jr. U.S. Pat. No. 3,285,781, Blue et al. U.S. Pat. No. 3,408,232, Childs U.S. Pat. No. 3,445,292, Portail U.S. Pat. No. 1,716,461 and Oppenheim U.S. Pat. No. 1,588,608 and Stokes, Jr. U.S. Pat. No. 2,796,456. Also of some interest are U.S. Pat. Nos. 3,040,115, 3,073,884, 3,455,744, 3,459,596, 3,507,700 and 3,514,334.

Even batteries which can be efficiently recharged at high rates suffer harsh drawbacks since practical recharging would require specially constructed recharging stations with very unusual capabilities. For example, for recharging in less than 10 minutes, the charging station would have to be vast and the cables large and expensive. In order to recharge a 20 kilowatt hour system in 10 minutes, one would need a 120 kilowatt supply. If the output of the battery is 80 volts, the required current would be 1500 amperes.

In a patent application entitled AQUEOUS ALUMINUM-HALOGEN ELECTROCHEMICAL CONVERTER, Ser. No. 141,906 filed May 10, 1971, now abandoned, by H. N. Seiger and E. L. Ralph, filed concurrently herewith, a novel high energy density battery assembly is disclosed which may be mechanically "recharged" i.e., the reactive components are simply replaced. The components constituting the battery are inexpensive, common materials, yet the energy output is sufficiently high to be useful as a power source for an electric vehicle. Specifically, the battery assembly utilizes a consumable aluminum anode and a cathode comprising halogen diffused through a permeable, electrically conductive electrode, in an aqueous electrolyte solution. The halogen is metered in accordance with load requirements, until the aluminum anode is effectively exhausted. Thereupon, the anode and electrolyte are simply replaced. Subsequently, aluminum and halide can be recovered from the electrolyte solution to provide a closed ecological cycle. While this system meets the general requirements for an all electric vehicle, potentials close to theoretical are not obtained. It would be desirable, and an object of the present invention, to maximize the energy and power of such a system.

The present invention provides improved high energy density batteries which have open circuit potentials close to theoretical, e.g., 80–85 percent of theoretical or higher. In particular, an activated aluminum anode is provided by continuously alloying its surface during discharge with a metal more noble than aluminum. The anode may be alloyed by coating its surface with such a metal, or preferably, by dissolving ions of the metal in the electrolyte. Preferred metals are mercury, gallium, cadmium, indium and thallium. Mercury is a particularly effective alloying metal and it can be incorporated either by amalgamating the surface of the aluminum anode or, preferably, by adding mercurous or mercuric ions to the electrolyte.

It has been estimated that a power supply would require characteristics of 135 watt-hour per pound and 2 watt-hour per cubic inch, for use in an all electric vehicle. A battery constructed in accordance with the present invention more than meets these requirements.

DETAILED DESCRIPTION

Figure 1:
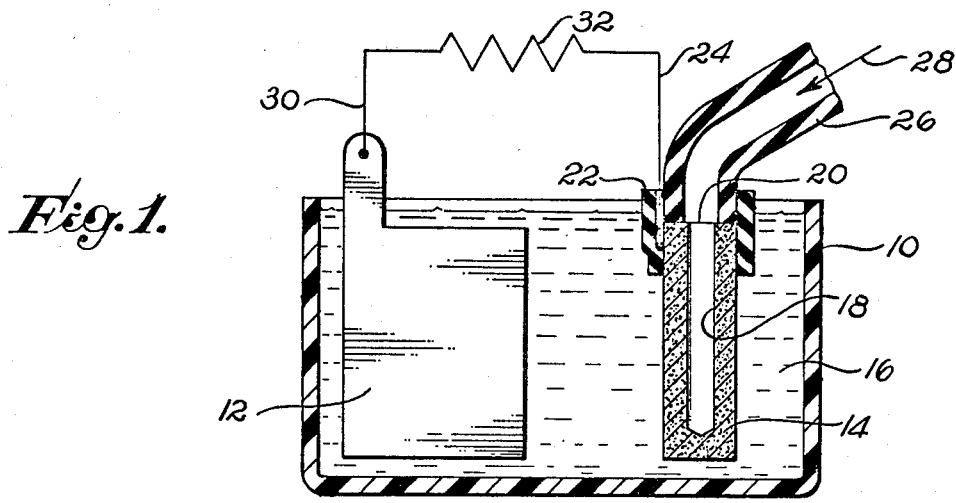
FIG. 1 is a schematic, cross-sectional view of a battery utilizing the present invention.

Referring to FIG. 1, a battery is schematically illustrated including a casing 10 in which is disposed a foil 12 of aluminum, a gas permeable, electrically conductive, inert cathode electrode 14 of porous material, and an electrolyte solution 16. The cathode electrode 14 is cylindrical and formed with an axially central hole 18 through its upper end 20. Tubing 22 connects an electrical lead 24 to the upper cathode electrode end 20 and is fitted with a rubber tube 26 for receiving the oxidant. In this illustration the tube 26 is attached to a tank of chlorine or supply of other oxidant so that metered oxidant can enter the cathode electrode 14, as indicated by the arrow 28. If a solid or liquid oxidant is used, means are provided to heat the oxidant to above its boiling point to place it in gaseous form. An electrical lead 30 is connected to the aluminum anode 12 and is connected, with the cathode lead 24, across a load 32. The aluminum electrode 12 is consumed as a result of reaction with oxidant ions which are replenished by migration through the electrolyte, producing an electric current.

Figure 2:
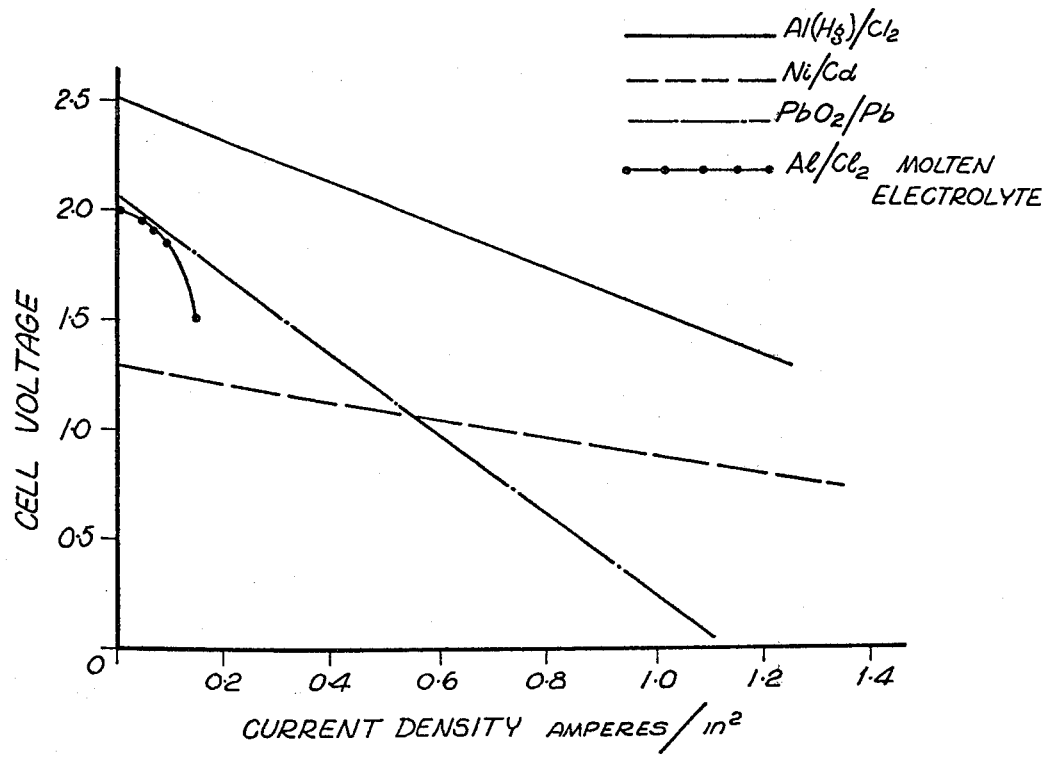
FIG. 2 shows the voltage characteristics of a battery assembly of the present invention as compared to the voltage characteristics of prior art batteries.

In accordance with this invention, mercury has been incorporated in the surface of the anode. This is achieved in this particular embodiment as a result of including mercury ions in the electrolyte, for example, mercuric ions added in the form of mercuric chloride to the extent of about 0.01 molar. As a result of the inclusion of the mercury, the current is conducted under a substantially greater cell voltage than heretofore obtained. The extent of the improvement can be illustrated by reference to FIG. 2 which compares the voltage characteristics of a battery assembly as above described with the characteristics of typical nickel-cadmium and lead acid batteries. Also compared is an aluminum-chlorine battery using a molten aluminum chloride-sodium chloride-potassium chloride (66%:20%:14%) electrolyte at 150°C (J. Giner and G. L. Holleck: *Aluminum-Chlorine Battery*, NASA Cr-154, March 1970). It will be seen that the present battery assembly has an open circuit voltage of 2.5 volts compared to 1.3 volts for a nickel-cadmium battery, 2.1 volts for a lead acid battery and 2.0 volts for the molten electrolyte battery. Importantly, 580 milliamperes of current are drawn per square inch of electrode surface at a cell potential of 2 volts. With 80 percent utilization of anode material, a 20 mil thick anode is all that is required to generate power at a rate of 1 watt per inch square for 4 hours of operation. Referring to the criteria required for an electric car as hereinbefore outlined, to obtain 80 volts for operation, there is thus required only 40 cells. With a structure in which chlorine electrodes surround aluminum electrodes. The aluminum would be discharged at 1.06 amperes per square inch. An aluminum-chlorine system has a theoretical watt-hour per pound ratio of 822. Calculating on the basis of the weights of aluminum and chlorine, a battery constructed in accordance herewith exceeds the requirements as above outlined, having estimated characteristics of 146 watt-hour per pound and 5 watt-hour per cubic inch.

In comparison, the nickel-cadmium, lead acid and molten electrolyte batteries show much lower performance characteristics. The equal power point with the nickel-cadmium battery occurs at about 2 amperes per inch square current density. However, even at that current density the nickel-cadmium system has a watt-hour/pound ratio too low for utilization as an on-board battery system for an all electric vehicle in accordance with the aforenoted criteria.

While it is not intended to limit this invention by an explanation of theoretical mechanisms of operation, it is thought that the following description is sound in its basis and is in conformity with experimental facts. According to present understanding of the invention, the aluminum surface of the anode 12 is amalgamated or alloyed with mercury or other activating metal and fresh surface is continuously alloyed with the activating metal during discharge. It is thought that the following reaction may take place between the surface aluminum and activating metal ions in the electrolyte, exemplified by mercuric ions.

(1) $SAl + 3Hg^{+2} \rightarrow 2Al^{+3} + 3Hg° + SAl°$ wherein S refers to surface aluminum. Since elemental mercury is formed on the fresh aluminum surface, it amalgamates with the aluminum as follows:

(2) $Hg° + SAl° \rightarrow SAl(Hg)$

During discharge, the amalgamated aluminum reacts as follows, using chlorine as an exemplary oxidant:

(3) $SAl(Hg) + 3Cl^- \rightarrow AlCl_3 + Hg° + SAl° + 3e$

The mercury is on the surface ready to amalgamate further as shown in reaction (2).

The anodic reaction which takes place during the electrochemical process and the standard oxidation-reduction potential (E°), on the standard hydrogen scale with the Gibbs-Stockholm convention, are as follows:

(4) $2Al(Hg) \rightarrow Hg° + 2Al^{+3} + 6e$    $E° = -1.66$ volts

With chlorine as exemplary of the oxidant, the reduction reaction which takes place at the cathode and the standard oxidation-reduction potential are as follows:

(5) $3Cl_2 + 6e \rightarrow 6e^-$    $E° = 1.36$ volts

The net reaction of the aluminum-chlorine system and calculated potential thereof are as follows:

(6) $2Al + 3Cl_2 \rightarrow 2AlCl_3$    $E° = 3.02$ volts

Reaction continues until the aluminum anode is effectively consumed, generally utilizing about 80–85 percent of the aluminum. At that point the anode can be simply replaced. The reasons for activation are not entirely understood, but it can be theorized that a monolayer of aluminum oxide which would otherwise detract from effective operation is mechanically removed by discharge, aided by the alloying of the surface with the activating metal ions, a fresh surface being maintained by the continuous realloying of the surface during discharge. In any event, the result is a dramatic increase in both open circuit and load voltages as compared to similar battery assemblies which do not utilize an activated anode.

In accordance with the broader aspects of the invention, the activating metal should be one which is more noble than aluminum so as to deposit on the surface thereof, and such metals can be found by reference to the standard electrochemical series. In particular, mercury is a most preferred metal as very readily amalgamating with the aluminum surface and mercury and the periodically allied metals gallium, cadmium indium and thallium constitute a preferred group of metals. Generally, there should be at least 0.00001 molar concentration of metal ion in the electrolyte, the upper limit being defined only by solubility factors. The activating metal can be applied by alloying directly with the surface of the aluminum or, preferably, by dissolving ions thereof in the electrolyte for subsequent reaction with the anode surface upon discharge. Such salts as the chlorides, bromides, fluorides, iodides, iodates, nitrates, sulfates, and the like, can be utilized.

With mercury as the activating metal, one can apply the metal directly to the anode surface to obtain an amalgamation or one can add mercuric or mercurous salts to the electrolyte. Mercuric chloride is soluble to the extent of about 0.1 molar. Other mercuric salts may also be used. Mercurous chloride is much less soluble, about 0.00001 molar, but can be used. Because of its low solubility the mercurous ion may in some cases activate only portions of the anode with the resultant development of small holes in the electrode upon continuous discharge. Accordingly, it is preferred to use the mercuric ion or a combination of mercurous and mercuric ions.

One of the advantages of the activation afforded by the present invention is that a larger choice of oxidants is available than would otherwise be the case. As oxidant, one can utilize the halogens, oxygen or sulfur. The following standard oxidation-reduction potentials are obtained:

$3F_2 + 6e \rightarrow 6F^-$     $E° = 2.87$ volts
$3Cl_2 + 6e \rightarrow 6Cl^-$     $E° = 1.36$ volts
$3Br_2 + 6e \rightarrow 6Br^-$     $E° = 1.09$ volts
$3I_2 + 6e \rightarrow 6I^-$     $E° = 0.54$ volt
$3O_2 + 12e \rightarrow 6O^{-2}$     $E° = 0.40$ volt
$6S + 12e \rightarrow 6S^{-2}$     $E° = 0.14$ volt The net reactions of the aluminum-oxidant systems and calculated potentials thereof are as follows:

$2Al + 3F_2 \rightarrow 2AlF_3$     $E° = 4.53$ volts
$2Al + 3Cl_2 \rightarrow 2AlCl_3$     $E° = 3.02$ volts
$2Al + 3Br_2 \rightarrow 2AlBr_3$     $E° = 2.75$ volts
$2Al + 3I_2 \rightarrow 2AlI_3$     $E° = 2.20$ volts
$4Al + 3O_2 \rightarrow 2Al_2O_3$     $E° = 2.06$ volts
$4Al + 6S \rightarrow 2Al_2S_3$     $E° = 1.80$ volts The above electrochemical reactions are effected by bringing the aluminum and oxidant components into contact in an aqueous electrolyte. One can utilize aluminum with purities ranging from 99.999 to 99 percent or lower, or alloys of aluminum can be used. Such alloys can contain small amounts, from about 0.001 to about 2 weight percent of alloying components such as zinc, tin, bismuth, magnesium intermetallic compounds such as $Mg_2Si$, and the like. See for example the aluminum alloys referred to in Stokes, Jr. U.S. Pat. No. 2,796,456, incorporated herein by reference. Commercial aluminum foil, such as that utilized in the manufacture of capacitors, can be obtained having a purity of 99.99 percent. Commercial grades of aluminum 99 percent, are readily available. In place of foil as illustrated in FIG. 1, one can utilize powdered aluminum or pelletized aluminum contained in a suitable electrode structure. Generally, when the aluminum is alloyed with a metal that more readily forms an amalgam than aluminum, the effect of the activator may be degraded. In such cases, the amount of the activating metal ion should be increased. An advantage of the system of the present invention is that the aluminum anode can be very readily and easily replenished. The system is mechanically "recharged" by simply inserting an aligned array of aluminum anodes interdigitated with permanently placed diffusion cathodes, as referred to in the copending Seiger and Ralph application noted above.

Prior to use, the aluminum contains an outer layer of aluminum oxide which decreases the load voltage. With usual amounts of activating metal, such as mercuric ion, the outer layer is apparently penetrated within seconds after immersion in electrolyte containing the activating ions and presents no problem. However, when the concentration of activating metal is low, such as with mercurous ions, a discharge to cathodize the aluminum may be necessary to bring about activation. This can be accomplished simply by applying a load for a few seconds, whereby the surface oxide layer is removed.

The oxidant is combined with an electrode to constitute the cathode of the battery. Broadly, any electrode structure can be utilized which is coupled with a mechanism for supplying oxidant to the interface that exists between the electrode and the electrolyte. A gas permeable electrode is conveniently used with the oxidant diffusing through the material of the electrode. The cathode is preferably constructed of porous carbon, but other materials can be utilized. For example, one can utilize a cathode electrode constructed of porous titanium or other refractory metal or porous graphite, all as known to the art. In the cell illustrated in FIG. 1, the cathode electrode 14 is constructed of a fine pore material which is wet-proofed by coating with Teflon and is made conductive with a layer of titanium, the electrode having a porosity of about 50 percent. Other electrodes can be utilized with varying results, one such electrode is constructed of porous carbon and sold by the Speer Carbon Division of Airco under the trade name of Speer Carbon 37, and has a porosity of 31.5 percent based on water imbibition. Commercially available oxidant can be utilized; for example, 99.5 percent pure chlorine can be supplied from a 150 pound cylinder. Commercial grades of bromine, fluorine, iodine, oxygen and sulfur can be readily utilized.

As electrolyte, particularly good results are obtained when the oxidant is a halogen if one uses an aqueous solution of ammonium halide corresponding to the halide used at the cathode. However, other aqueous electrolytes can be used with good results and in this regard one can utilize an aqueous solution of any of the wide variety of common, well known electrolytes. For example, one can utilize a stongly ionized salt having as the cation $NH_4^+$, $K^+$, $Na^+$, $Ca^{+2}$, $Mg^{+2}$, $Li^+$, $Al^{+3}$, $Pb^{+2}$ or $R_4N^+$ wherein R is an organic radical (such as methyl, ethyl, benzyl, etc.) to yield a quartenary ammonium compound. One can utilize a strongly ionized salt having as the anion, a halogen (e.g., $F^-$, $Cl^-$, $Br^-$, $I^-$) $ClO_3^-$, $BrO_3^-$, $ClO_4^-$, $BO_2^-$, a sulphate ($SO_4^{-2}$, $HSO_4^-$) a phosphate ($PO_4^{-3}$, $HPO_4^{-2}$, $H_2PO_4^-$) or a dibasic acid (e.g., oxalate, succinate, tartrate). Such strongly ionized salts, as known, are substantially neutral thereby providing a substantially neutral electrolyte. An electrolyte concentration of about 5 to about 30 percent by weight in water is generally satisfactory.

The following examples will further illustrate this invention.

EXAMPLE I

A cell was arranged as in FIG. 1 employing an aqueous electrolyte solution of 25 weight percent ammonium chloride containing 0.001 mole/liter of mercuric chloride, gaseous chlorine as a cathode having a porosity of about 50 percent, and a high purity (99.99 percent) aluminum foil as the anode. The aluminum foil and cathode both had effective surfaces of 10 $CM^2$. The cell was operated at 25°C and found to have an open circuit potential of 2.52 volts. The results obtained at various loads are tabulated in the following Table 1.

Table 1

| Cell Voltage (volts) | Current Density (amps/inch²) |
| --- | --- |
| 2.42 | 0.1 |
| 2.33 | 0.2 |
| 2.05 | 0.5 |
| 1.88 | 0.7 |
| 1.62 | 1.0 |
| 1.53 | 1.1 |

EXAMPLES II–VI

A cell was arranged as in FIG. 1 employing an aqueous electrolyte solution of 22.5 weight percent ammonium chloride, gaseous chlorine at a cathode having a porosity of about 50 percent, and high purity foil as the anode, the foil and cathode both having effective surfaces of 10 cm². A number of electrolyte solutions were prepared containing various salts for activation as tabulated in the following Table 2.

Table 2

| Example | Additive | Initial Open Circuit[1] | 300 ma/in² | 600 ma/in² | 1500 ma/in² | Final Open Circuit[2] |
|---------|----------|------|------|------|------|------|
| II  | —                    | 1.88 |      |      |      | 1.88 |
| III | $0.01M KNO_3$        | 1.88 | 1.77 |      |      | 1.88 |
| IV  | $0.01M Hg(NO_3)_2$   | 2.52 | 2.20 | 2.10 | 1.62 | 2.50 |
| V   | $0.01M HgCl_2$       | 2.4  |      |      |      |      |
| VI  | $0.00001M HgCl$      | 1.88 |      |      | 1.64 | 2.51 |

[1]taken before current is drawn from the battery
[2]taken after current is drawn from the battery Each cell was operated at 25°C. Referring to the data in Table 2, it can be seen that when the cell was operated with electrolyte which did not contain any activator, an open circuit potential of 1.88 volts was obtained. After discharge of the load, the open circuit potential was again 1.88 volts. When 0.01 molar concentration of potassium nitrate was added, no voltage rise was observed illustrating that the nitrate ion does not cause a voltage rise. This particular electrode was discharged at 300 milliamps per square inch at a voltage of 1.77 volts. On the other hand, when mercuric nitrate at a concentration of 0.01 molar was added to the electrolyte, the open circuit voltage was found to be 2.52 volts, which is 83 percent of theoretical. When discharged at 300 milliamps per square inch, the voltage was 2.20 volts, a marked improvement over the 1.77 volts exhibited by the cell containing potassium nitrate. Subsequent loads of 600 milliamps per square inch and 1500 milliamps per square inch showed discharge voltages of 2.10 and 1.62 volts respectively. Following such discharge under load, the open circuit potential was found to be 2.50 volts.

When mercuric chloride was added at 0.01 molar concentration, the open circuit voltage was found to be 2.4 volts.

When mercurous chloride was added to its solubility limit of 0.00001 molar concentration, the open circuit voltage was low, only 1.88 volts, but increased to 2.51 after discharge at 1500 milliamps per square inch. Under that load, the cell voltage was 1.64 volts, comparable to the larger concentration of mercuric nitrate. This illustrates the effect of low concentration of mercurous ion and that discharge of the aluminum is useful to enable the ions to activate the surface of the anode.

EXAMPLE VII

Example IV was repeated and following discharge, the cell had an open circuit voltage of 2.50 volts. The cell was cleaned and refilled with fresh aqueous electrolyte solution of 25 weight percent ammonium chloride. The electrode was found to again have a high open circuit voltage, about 2.5 volts. At that point, an identical electrode, but having an untreated surface, was inserted into the electrolyte and was found to have an open circuit voltage of 1.8 volts. When the new electrode was placed into physical contact with the activated electrode, the open circuit potential of the couple was found to be 2.5 volts. When separated from the activated electrode and allowed to stand for about one-half hour, the voltage of the new electrode stabilized at 2.30 volts. Calomel (mercurous chloride) was added and the voltage increased to 2.34 volts. At that point the electrode was discharged under a load of 1500 milliamps per inch square until the current spread over about 50 percent of its surface. The open circuit voltage for this electrode was then found to be 2.42 volts. All of the foregoing illustrates the dramatic activating effect obtained as a result of the practice of this invention.

EXAMPLE VIII

Cells can be operated in accordance with Example I but utilizing 0.001 molar concentrations of gallium, cadmium, indium and thallium, respectively to obtain improved voltage characteristics.

In modification of EXAMPLE I, in place of the chlorine, one can utilize oxygen, bromine, iodine, fluorine, or sulfur. For the ammonium chloride, one can utilize an equivalent amount of ammonium bromide, potassium chloride, calcium chloride, potassium bromide, sodium bromide, ammonium sulfate, ammonium perchlorate, ammonium chlorate, sodium meta borate, ammonium phosphate, tetramethyl ammonium chloride, sodium oxalate, sodium succinate, sodium tartrate, ammonium oxalate, or the like, or mixtures thereof.

As required, detailed illustrative embodiments of the invention have been disclosed. However, it is to be understood that these embodiments merely exemplify the invention which may take forms different from the specific illustrative embodiments disclosed. Therefore, specific structural and functional details are not necessarily to be interpreted as limiting, but simply as a basis for the claims.

I claim:

1. A method for obtaining electrical energy, comprising the steps of:

providing a battery assembly comprising an aqueous substantially neutral electrolyte, a consumable anode in said electrolyte, said anode comprising about 98 weight percent or more aluminum, and a permeable, electrically conductive cathode in said electrolyte; and introducing elemental halogen fluid internally of said cathode for diffusion therethrough into contact with said electrolyte;

said electrolyte comprising a strongly ionized salt, and including at least $10^{-5}$ mole/liter of mercury ion, as activating ions for said aluminum, said salt being so selected that the open circuit voltage of said assembly is about 2.5 volts or higher.

2. The method of claim 1 in which said salt is calcium chloride.

3. The method of claim 1 in which said salt is ammonium chloride.

4. The method of claim 1 in which said activating mercury ions comprise mercuric ions.

5. The method of claim 4 in which said mercuric ions are added to said electrolyte as mercuric chloride.

6. The method of claim 1 in which said activating mercury ions are mercurous ions.

7. The method of claim 1 in which said halogen fluid is chlorine.

8. The method of claim 1 in which said salt comprises a component different from one or the other of said aluminum and halogen.

9. The method of claim 1 in which said salt comprises a salt of chlorine.

* * * * *